(12) United States Patent
Gibson

(10) Patent No.: US 7,777,359 B1
(45) Date of Patent: Aug. 17, 2010

(54) METHOD AND APPARATUS FOR GENERATING ELECTRICAL ENERGY

(76) Inventor: Allan L. Gibson, 2528 S. Olive St., Sioux City, IA (US) 51106-3836

( * ) Notice: Subject to any disclaimer, the term of this patent is extended or adjusted under 35 U.S.C. 154(b) by 471 days.

(21) Appl. No.: 11/877,828

(22) Filed: Oct. 24, 2007

(51) Int. Cl.
*F03B 13/00* (2006.01)
*F03D 9/00* (2006.01)
*F03C 1/00* (2006.01)

(52) U.S. Cl. .................... 290/54; 290/1 R
(58) Field of Classification Search .............. 290/1 R, 290/43, 54, 1 D; 60/495
See application file for complete search history.

(56) References Cited

U.S. PATENT DOCUMENTS

| | | | |
|---|---|---|---|
| 4,286,928 A * | 9/1981 | Clay | ............... 417/329 |
| 4,443,707 A | 4/1984 | Scieri | |
| 5,905,312 A | 5/1999 | Liou | |
| 6,445,078 B1 | 9/2002 | Cieslak | |
| 6,546,726 B1 * | 4/2003 | Tomoiu | ............... 60/495 |
| 6,981,376 B2 | 1/2006 | Dutta | |
| 7,619,320 B2 * | 11/2009 | Omer | ............... 290/54 |
| 2007/0138875 A1 | 6/2007 | Hall | |

* cited by examiner

*Primary Examiner*—Nicholas Ponomarenko
(74) *Attorney, Agent, or Firm*—McKee, Voorhees & Sease, P.L.C.

(57) ABSTRACT

An electrical generating system includes a shaft connected to a pair of electrical generators through unidirectional gear boxes so as to alternatingly generate electricity in the respective generators during oscillating rotation of the shaft. The shaft is rotated by the rise and fall of a pair of tanks connected by a chain trained over a sprocket on the shaft. A reversible pump transfers water or other liquid between the tanks which fall as liquid is supplied to the tanks. Springs beneath the tanks provide a restoring force to provide enhanced efficiency in the up and down movement of the tanks. Thus, each falling tank generates electricity via the rotating sprocket in the respective generators.

17 Claims, 2 Drawing Sheets

METHOD AND APPARATUS FOR GENERATING ELECTRICAL ENERGY

BACKGROUND OF THE INVENTION

1. Field of Invention

The present invention relates to the generation of electrical power, and more particularly to a system for generating electrical energy.

2. Problems in the Art

Methods for generating electricity that protect the environment and maintain affordability are in unprecedented demand. Conventional methods of hydro power, fossil fuel, nuclear power, wind power, and gravity power demonstrate inadequacies in addressing these demands. Diminishing fossil fuel supplies have created volatile market prices while the damaging effects of emissions from fossil fuel power plants has led to widespread demand for cleaner technologies. Hydro power is often unavailable in areas lacking the necessary water supply. Wind power may be unreliable in may areas. Nuclear power requires large volumes of water to cool the reactors and raises numerous safety, environmental and political issues. Prior art electrical generators based on gravity have not proven to be commercially viable.

Thus there is a need for power production that overcomes the limitations and problems of the prior art, that is pollution or emission free, and that is affordable. Additionally, there is a need for an apparatus that can be readily assembled and integrated into existing infrastructure.

There is also a need in the art to provide for a method and apparatus for generating electrical energy which does not require a specific geographic location to generate electricity.

SUMMARY OF THE INVENTION

In a preferred embodiment of the present invention, the electrical energy generating system includes at least one rotational shaft having first and second unidirectional gears which work in opposite directional rotation of one another to alternatingly transfer rotational energy of the shaft to first and second electrical generators operatively connected to the first and second gears, respectively. The preferred embodiment further comprises a first tank and a second tank each being adapted to hold a fluid, and being connected by a chain trained over a sprocket on the shaft second sprockets, respectively, whereby the tanks move up and down opposite one another so as to alternatingly rotate the shaft in opposite directions.

A pump will transfer a liquid (preferably water) from the first tank at a lower position to the second tank at an upper position. The transfer pump in a preferred embodiment engage a limit switch that is triggered when the tank reaches a select height above the lower position. The pump is powered by an external source of power.

First and second springs are positioned beneath the tanks such that each opposing tank will compress the respective springs when each tank reaches a lower position. More particularly, the first tank begins traveling downwardly until the tank reaches a lower position where the first spring is compressed. At this time, liquid is transferred from the first tank at the lower position to the second tank at an upper position. When a sufficient amount of liquid has been transferred to the second tank, the first spring will exert a restoring upward force on the first tank, to start an identical process involving the second tank initially at an upper position.

Reciprocating rotation of the shaft at the input side of gearboxes produces a ratio-related rotational movement on the output side of the associated gearbox for the generation of electrical energy by the generators.

It is therefore a primary object, feature, advantage and aspect of the present invention to provide an improved method, apparatus, and system to generate electrical energy. Further objects, features, advantages or aspects of the invention include a method, apparatus and system which:

1. Generates electrical energy;
2. Utilizes spring energy to maximize efficiency of the system;
3. Does not require the burning of fossil fuels;
4. Produces no combustion gases that may be damaging to the environment;
5. Provides a power supply that is affordable and available during times of high demand;
6. Does not require a specific geographic location to generate electrical energy;
7. Facilitates integration into existing infrastructures;
8. Utilizes components that are readily available;
9. Utilizes components that are affordable; and
10. Is simple to build and operate.

DETAILED DESCRIPTION OF THE PREFERRED EMBODIMENT

For a better understanding of the present invention, a specific exemplary embodiment according to the present invention will be described in detail. This embodiment is by way of example and illustration only, and not by any way a limitation. It is envisioned that single or multiple shafts, sets of tanks, gear boxes, liquids, spring arrangements, or generators could be used in the present invention. The invention is defined solely by the appended claims.

Figure 1:
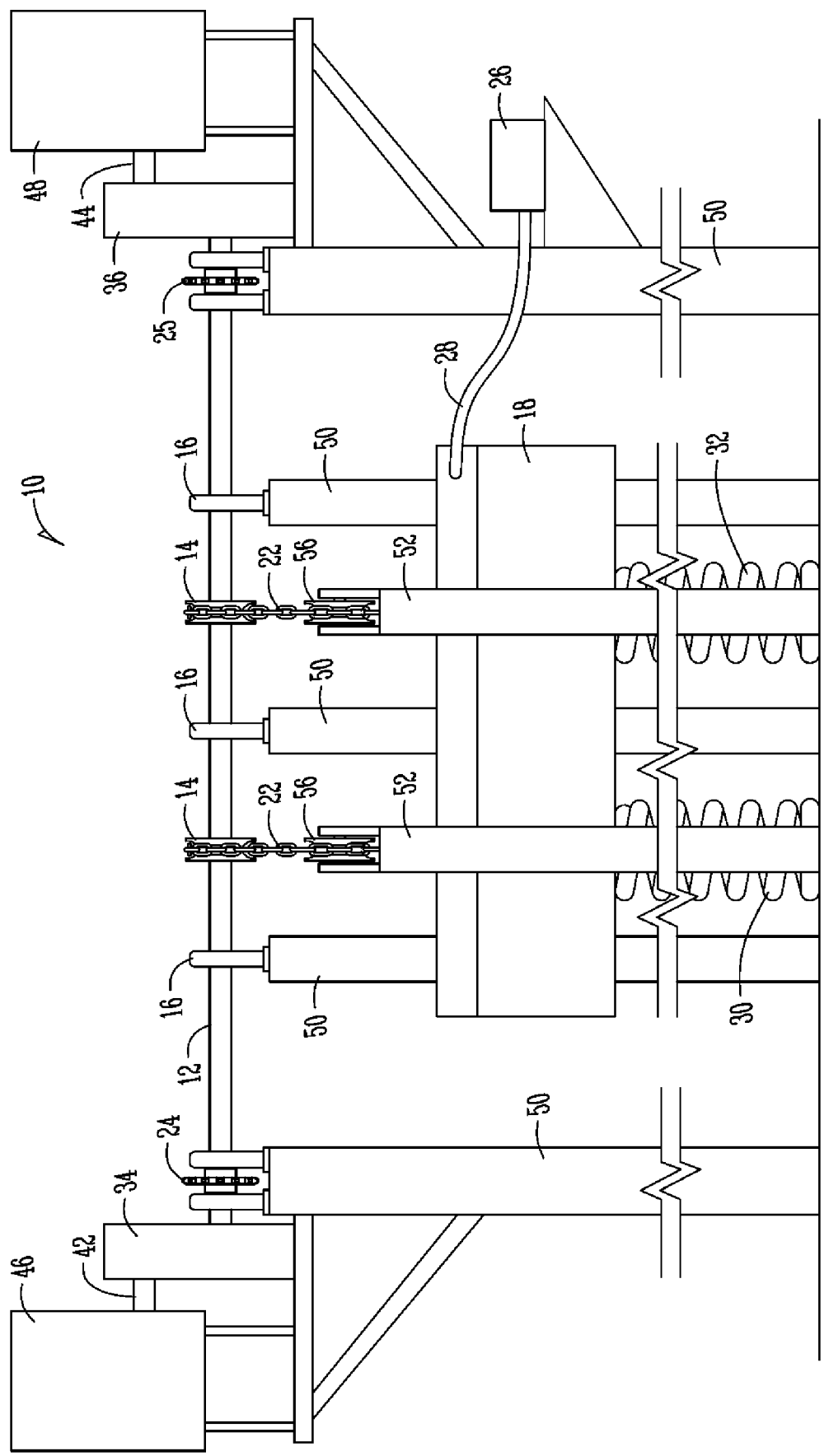
FIG. 1 is a schematic drawing illustrating a front view of the present invention.

FIG. 1 schematically illustrates the electrical energy generating system 10 of the present invention used to generate electricity. The electrical generating system 10 has a shaft 12 with one or more sprockets 14 mounted on the shaft 12. First and second tanks or receptacles 18, 20 are connected by a chain 22 or other connection means and engage the sprockets 14 mounted on the shaft 12. The tanks 18, 20 may be mounted on opposing sides of the shaft 12. The tanks are shown to be elongated with a pair of support chains 22, but it is understood that the tanks may be any shape, with one or more chains and sprockets for rotating the shaft 12, as described below.

Each of the tanks 18, 20 is adapted to hold a liquid, such as water, supplied from a reversible pump 26 via hoses 28. Springs 30, 32 are positioned beneath the tanks 18, 20. The springs 30, 32 exert restoring force to the tanks 18, 20 to aid the upward travel of the tanks 18, 20, as discussed below.

The pump 26 begins transferring water from the first tank 18, before it reaches its lower-most position, to the second tank 20 on the other side of the shaft 12 at an upper position. The pump 26 is activated by a limit switch (not shown) that is triggered when the tank 18, 20 reaches a pre-set height above the lower-most position. When a sufficient amount of water or liquid has been transferred, the spring 30 will exert a restoring or lifting force on the first tank 18 while the second tank begins downward travel to a lower position. The pump 26 is powered by an external power source which may include solar power, hydro power, wind power, or conventional electrical means. Thus, the tanks 18, 20 move up and down opposite one another as water is transferred back and forth between the tanks.

Unidirectional gears 24, 25 are mounted on the shaft in opposite directions. Thus, as the first tank 18 moves down, the chain 22 and first sprocket 14 rotate the shaft 12 and gear 24 in a first direction while the second gear 25 free-wheels or ratchets without any driving force. Then, as the second tank 20 moves down, the chain 22 and second sprocket 14 rotate the shaft 12 and second gear 25 in an opposite second direction while the first gear 24 free-wheels on ratchets.

First and second gear boxes 34, 36 are operatively connected to the gear boxes 24, 25, respectively. Each gear box 34, 36 has an output shaft 42, 44, respectively, operatively connected to first and second electrical generators 46, 48, as best seen in FIG. 1. The gear boxes 34, 36 may have any desired gear ratio.

Figure 2:
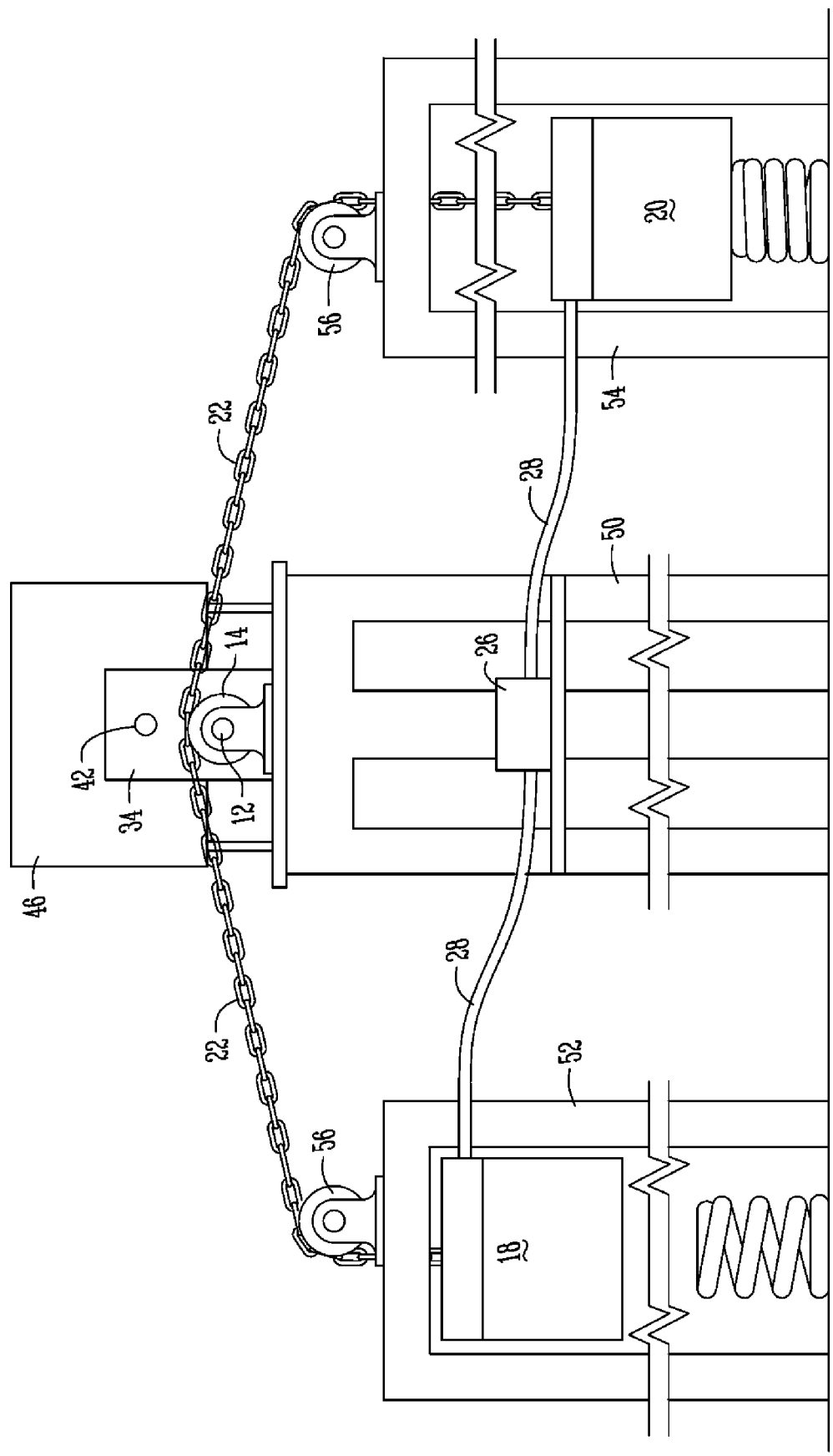
FIG. 2 is a schematic drawing illustrating a side view of the present invention.

As seen in the Figures, shaft 12 is supported by a plurality of columns or legs 50. Roller bearings 16 support the shaft on the columns 50, preferably in a horizontal orientation. The tanks 18, 20 are preferably mounted within frames 52, 54, respectively, for guided upward and downward movement. The chains 22 have opposite ends connected to the tanks 18, 20, as best seen in FIG. 2, and extend over rollers 56, as well as the respective sprockets 14 so as to impart reciprocating rotation to the shaft 12 as the tanks 18, 20 reciprocate upwardly and downwardly. The chain 22, sprocket 14 and roller 56 form a pulley system for the rise and fall of the tanks 18, 20. The columns 50 and frames 52, 54 may be any desired height.

Operation of the system 10 can readily be appreciated with reference to FIGS. 1 and 2. The pump 26 begins filling the tank 18 with a specified amount of water or liquid. This external fluid input provides the initial work to start the falling and rising of the tanks 18, 20. Accordingly, the first tank 18 will begin to fall while the second tank 20 begins to rise. The first tank 18 triggers a limit switch at a fixed height above the spring 30. The activation of the limit switch activates the pump 26 which begins the transfer of water or fluid from the falling first tank 18 to the rising second tank 20. The first tank 18 will continue to fall and compresses the spring 30. At this time, the pump 26 will transfer water or fluid from the tank 18 to the tank 20, such that the second tank 20 begins to fall. The compressed spring 30 exerts a restoring force on the first tank 18 to assist the initial upward movement of the tank 18 from its lower-most position. The spring 32 provides a similar restoring force for the tank 20.

The alternating rise and fall of the tanks 18, 20 rotate the shaft 12 in reciprocating directions, which in turn alternatingly drives the gear boxes 36, 38 and generators 46, 48. The gear boxes are configured such that one turn on the input side will yield a predetermined number of turns on the output side, as governed by the gear ratio. The output side of each gear box 34, 36 is operably connected to the respective electric generator 46, 48 such that electrical energy is produced by the falling and rising tanks 18, 20 rotating the shaft 12.

The present invention offers a plurality of advantages over prior art methods. Unlike prior art methods, the present invention does not require the use of fossil fuels. In addition, the present invention does not require the specific geographic demands present in hydro or wind power to generate electricity.

The present invention can be assembled using parts that are both readily available and affordable. Therefore the present invention is useful to provide a power supply that is affordable and available during times of high demand. The present invention can be easily integrated into existing infrastructures to meet this demand.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A system for generating electricity, comprising:
   a shaft having a sprocket;
   first and second tanks;
   a chain trained about the sprocket and having opposite ends connected to the tanks;
   a pump to transfer fluid between the tanks whereby the tanks alternatingly move upwardly and downwardly to reciprocatingly rotate the shaft in opposite directions;
   first and second gears mounted on the shaft for actuation by the shaft rotating in opposite directions; and
   first and second generators operatively connected to the first and second gears, respectively, so as to generate electricity as the shaft rotationally reciprocates.

2. The system of claim 1 further comprising first and second springs associated with the first and second tanks, respectively, to provide a restoring force to the associated tank in an initial period of the upward movement.

3. The system of claim 2 wherein the springs are compression springs.

4. The system of claim 2 wherein the springs are beneath the tanks.

5. The system of claim 1 further comprising a frame for guiding movement of the tanks.

6. The system of claim 1 wherein the gears are unidirectional and activate alternatingly as the shaft alternates rotational directions.

7. The system of claim 1 wherein the pump is reversible.

8. The system of claim 1 wherein the shaft is horizontal.

9. The system of claim 1 wherein the shaft is supported by roller bearings.

10. A method of generating electricity, comprising:
    alternatingly transferring fluid between first and second tanks supported by a pulley system so as to raise and lower the tanks in opposite directions;
    rotating a shaft in reciprocating opposite directions via the movement of the tanks;
    operatively connecting the shaft to a pair of generators to alternatingly generate electricity in the respective generators by the reciprocating shaft.

11. The method of claim 10 further comprising imparting a restoring force to each tank during an initial period of upward movement.

12. The method of claim 11 wherein the restoring force is imparted by a spring.

13. The method of claim 12 wherein the spring is compressed by the tank during a final period of downward movement.

14. The method of claim 10 wherein the fluid is transferred by a reversible pump.

15. The method of claim 10 further comprising operatively connecting first and second gear boxes between the shaft and the pair of generators.

16. The method of claim 15 further comprising a unidirectional gear for each gear box to alternatingly activate the gear boxes as the shaft rotates in opposite directions.

17. The method of claim 10 further comprising guiding the movement of the tanks.

\* \* \* \* \*